US005793999A

United States Patent [19]
Mori

[11] Patent Number: 5,793,999
[45] Date of Patent: Aug. 11, 1998

[54] INTERFACE UNIT AND A COMPUTER USING THE INTERFACE UNIT

[75] Inventor: Yasuhiro Mori, Moriguchi, Japan

[73] Assignee: Matsushita Electric Industrial Co., Ltd., Osaka-Fu, Japan

[21] Appl. No.: 647,680

[22] Filed: May 15, 1996

[30] Foreign Application Priority Data

May 17, 1995 [JP] Japan .................................. 7-118182
Apr. 3, 1996 [JP] Japan .................................. 8-081740

[51] Int. Cl.$^6$ .................................................. G06F 13/14
[52] U.S. Cl. ........................ 395/309; 395/280; 395/284; 395/311; 395/882; 395/892
[58] Field of Search ........................ 395/309–311; 2/280–284, 882–894

[56] References Cited

U.S. PATENT DOCUMENTS

| | | | |
|---|---|---|---|
| 5,111,423 | 5/1992 | Kopec, Jr. et al. | 395/500 |
| 5,335,338 | 8/1994 | Prosesl | 395/500 |
| 5,440,752 | 8/1995 | Lentz et al. | 395/303 |
| 5,499,344 | 3/1996 | Elnashar et al. | 395/308 |
| 5,561,826 | 10/1996 | Davies et al. | 395/891 |
| 5,666,495 | 9/1997 | Yeh | 395/281 |
| 5,671,400 | 9/1997 | Kiggens et al. | 395/500 |
| 5,687,346 | 11/1997 | Shinohara | 711/130 |
| 5,696,993 | 12/1997 | Gavish | 395/882 |

*Primary Examiner*—Christopher B. Shin
*Attorney, Agent, or Firm*—Panitch Schwarze Jacobs & Nadel, P.C.

[57] ABSTRACT

An interface unit having a hardware for converting a transfer mode of data is constituted with the logic cell block (1), the discrete block (2) and the wiring cell block (3), and including the configuration block (4) for memorizing plural logic information data for defining each function of the logic cell block and the discrete block, and plural wiring information data for defining function of the wiring cell block.

8 Claims, 8 Drawing Sheets

INTERFACE UNIT AND A COMPUTER USING THE INTERFACE UNIT

FIELD OF THE INVENTION AND RELATED ART STATEMENT

1. Field of the Invention

This invention relates to an interface unit for making logical connection between a CPU and a peripheral device such as a printer, and a computer using the interface unit.

2. Description of the Prior Art

In recent years, a personal computer (hereinafter referred to as a "PC") has been of light weight and small size. Thereby, a user can carry the PC easily, and a mobile computing, in which the PC carried with the user is used, has been spread. Concretely, a notebook type PC, such as of a B-5 paper size type (182 mm ×257 mm) having superior portability has been manufactured more than that of an A-4 paper size type (210 mm×297 mm) as a main commodity of the notebook type PC. Furthermore, there has been realized a portable type information terminal unit, such as a palm top PC and PDA (Personal Digital Assistants), as a computer having more superior portability. The computer carried with the user is connected to a peripheral device such as a printer and/or an internet, so that the mobile computing is executed.

It is known that an interface unit is disposed between the computer and the peripheral device to make logical connection between a CPU of the computer and the peripheral device. That is, the interface unit converts a transfer mode of data including a transfer speed of the data and an electrical level of the data or the like along the predetermined protocol in order to make the logical connection therebetween. Furthermore, a card-shaped interface unit (hereinafter referred to as an "interface card") is used in the above-mentioned computer having superior portability. The conventional interface card is standardized in accordance with the PCMCIA (Personal Computer Memory Card International Association) standard. The conventional interface card is constituted with a logic circuit to execute a protocol for converting one of the transfer mode. A card slot for receiving the interface card is standardized and equipped with the computer. The card slot is also standardized in accordance with the above-mentioned PCMCIA standard. Many vendors have been selling the various interface cards for any one of the peripheral device such as a modem, LAN, and SCSI. The user selects one of the various interface cards corresponding to the peripheral device to be connected with the computer. Then, the user inserts the interface card into the card slot, thereby to make connection between the computer and the above-mentioned peripheral device.

However, in the conventional interface card, it has been necessary to equip the card slot with the computer. In the case that the computer is of light weight and small size, there is a possibility that the card slot cannot be formed on a surface of the computer. Thereby, there is a problem that the card slot cannot be standardized and equipped with the computer.

Furthermore, in the conventional interface card, in order to connect the computer with plural peripheral device having protocols different from each other, the various interface cards need to be prepared corresponding to the plural peripheral devices. Moreover, in the case that the mobile computing is executed, there is a problem that the user is required to carry the various interface cards.

OBJECT AND SUMMARY OF THE INVENTION

The object of the present invention is to provide an interface unit that can solve the aforementioned problems.

In order to achieve the above-mentioned object, an interface unit in accordance with the present invention comprising:

a configuration block for memorizing plural logic information data and plural wiring information data, a logic cell block connected with a first port, a second port, a third port, and a fourth port, the logic cell block being programmable for a functional relation with the first port, the second port, and the fourth port in accordance with one of the plural logic information data issued from the third port, a discrete block consisting of plural electronic elements connected with a fifth port, for supplementing function of the logic cell block, a wiring cell block connected with the fourth port, the fifth port, and a sixth port, the wiring cell block being programmable for a relation with the fourth port and the fifth port in accordance with one of the plural wiring information data issued from the sixth port, and a control block for transferring the one of the plural logic information data and the one of the plural wiring information data to the logic cell block and the wiring cell block through the third port and the sixth port, respectively, the first port and the second port being interfaced with each other, namely, data being transferred between the first port and the second port converting a transfer mode of the data.

According to the interface unit of the present invention, a hardware for converting a transfer mode of data is constituted with the logic cell block, the discrete block and the wiring cell block. Furthermore, the configuration block memorizes plural logic information data for defining each function of the logic cell block and the discrete block, and plural wiring information data for defining function of the wiring cell block. Thereby, the user can select each one of the plural logic information data and the plural wiring information data corresponding to a peripheral device to be connected with a computer. As a result, it is possible to easily connect the computer with plural peripheral devices having protocols different from each other.

DESCRIPTION OF THE PREFERRED EMBODIMENT

Hereafter, preferred embodiments of the present invention are described with reference to the accompanying drawings.

<<FIRST EMBODIMENT>>

Figure 1:
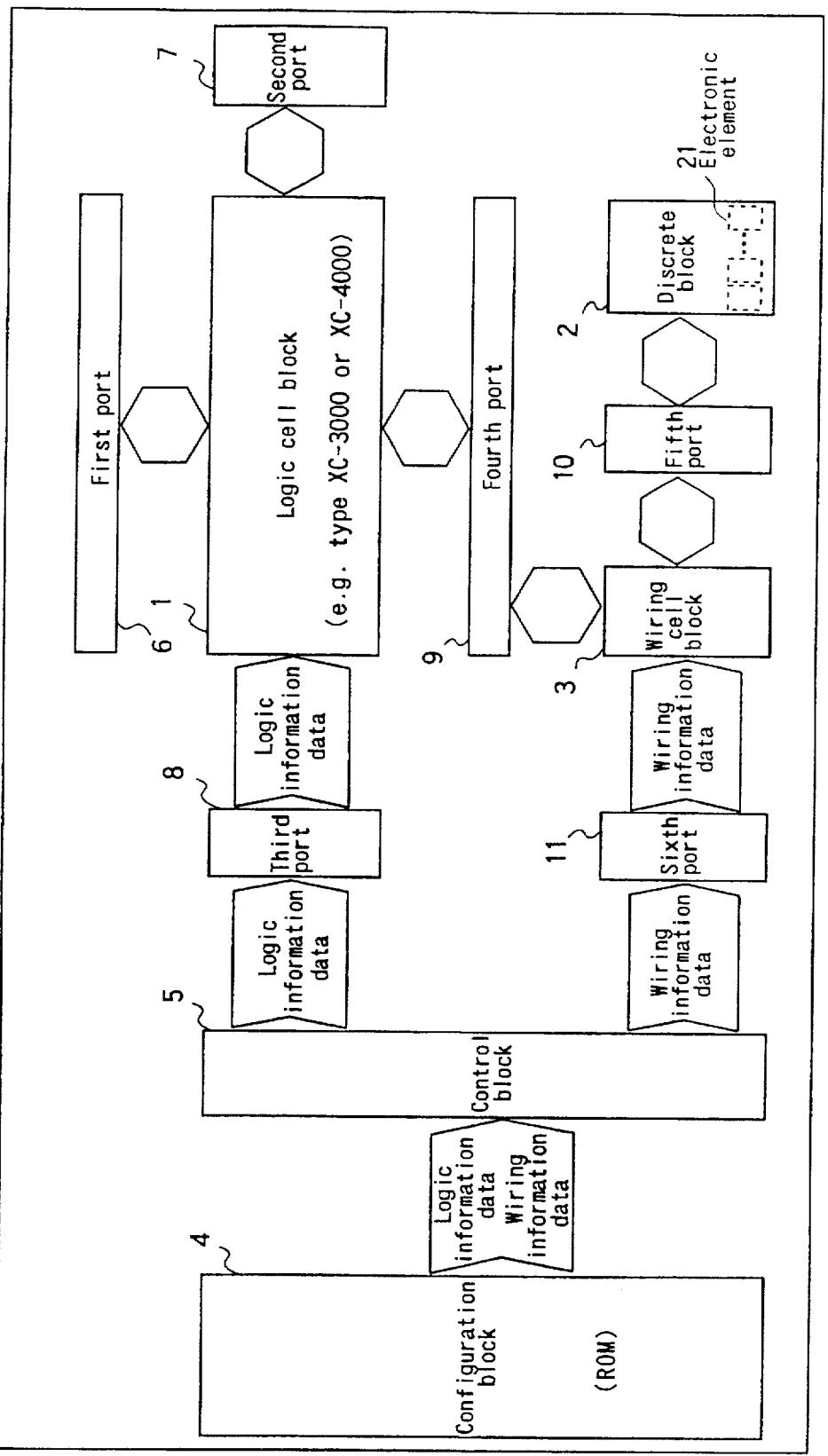
FIG. 1 is a block diagram showing an interface unit of a first embodiment of the present invention.

FIG. 1 is a block diagram showing an interface unit of a first embodiment of the present invention.

In FIG. 1, an interface unit 51 comprises a logic cell block 1 connected with a first port 6, a second port 7, a third port 8, and a fourth port 9, a discrete block 2 connected with a fifth port 10, and a wiring cell block 3 connected with the fourth port 9, the fifth port 10 and a sixth port 11. Furthermore, the interface unit 51 includes a configuration block 4 memorizing plural pairs of logic information data and wiring information data, and a control block 5 for executing a down load of one pair of the logic information data and the wiring information data to the logic cell block 1 and the wiring cell block 3 via the third port 8 and the sixth port 11, respectively. The interface unit 51 is formed on a printed circuit board (not shown) having a predetermined size (e.g. 150 mm×100 mm). One of the first port 6 and the second port 7 is connected with a computer (not shown), and the other is connected with one of peripheral devices such as a modem, a LAN, and a printer.

The logic cell block 1 substantially defines function of the interface unit 51 in accordance with the logic information data. The logic cell block 1 uses an LSI, for example, LCA series, type XC-3000 or XC-4000 manufactured by XILINX LTD. In the LSI, are integrated a memory cell and plural logic circuits such as a multiplexer circuit and a flip flop circuit. The memory cell is connected with the third port 8, so that the logic information data are down-loaded from the control block 5 to the memory cell through the third port 8. Each of the plural logic circuits is connected with the first port 6, the second port 7, and the fourth port 9. These plural logic circuits are made wired in the LSI in accordance with the logic information data. That is, in the plural logic circuits, a functional relation with the first port 6, the second port 7, and the fourth port 9 is made programmable in accordance with the logic information data, so that function of the logic cell block 1 is defined.

The discrete block 2 is a block auxiliary to the function of the logic cell block 1, and is constituted with plural electronic elements 21 such as a resistance, a condenser, an LED. Each of the plural electronic elements 21 is connected with the fifth port 10.

The wiring cell block 3 is constituted with an LSI having a memory cell. The wiring cell block 3 makes an electrical connection between the fourth port 9 and the fifth port 10 in accordance with the wiring information data stored in the memory cell. That is, in the wiring cell block 3, a wiring relation between the fourth port 9 and the fifth port 10 is made programmable in accordance with the wiring information data, so that the predetermined logic circuits of the logic cell block 1 are connected with the predetermined electronic elements 21 of the discrete block 2.

The configuration block 4 is constituted with a memory such as a ROM, and memorizes plural pairs of the logic information data and the wiring information data. Each one pair of the logic information data and the wiring information data is equal to a protocol for making logical connection between the computer and the peripheral device, and is stored in an address of the ROM.

The control block 5 has a TTL circuit, and reads one pair of the logic information data and the wiring information data from the configuration block 3. The one pair of the logic information data and the wiring information data are separated into two data, namely, the logic information data and the wiring information data by the TTL circuit. Thereafter, as has been explained in the above, the control block 5 executes the down load of the logic information data and the wiring information data to the logic cell block 1 and the wiring cell block 3 via the third port 8 and the sixth port 11, respectively.

The operation of the interface unit 51 will be explained.

A user designates one address from the control block 5 to the ROM in the configuration block 4 corresponding to the peripheral device to be connected with the computer. Thereby one pair of the logic information data and the wiring information data stored in the designated address are selected. Thereby, the logic information data and the wiring information data are down-loaded to the logic cell block 1 and the wiring cell block 3, respectively. Successively, in the wiring cell block 3, the wiring relation between the fourth port 9 and the fifth port 10 is made programmable. Simultaneously, in the logic cell block 1, the functional relation with the first port 6, the second port 7, and the fourth port 9 is made programmable. As a result, a transfer mode of data including a transfer speed of the data and an electrical level of the data is converted in the logic cell block 1 and the discrete block 2. Thereby, it is possible to make logical connection between the CPU of the computer and the peripheral device.

Thus, in the interface unit 51 of the first example, a hardware for converting the transfer mode is constituted with the logic cell block 1, the discrete block 2 and the wiring cell block 3. Furthermore, the configuration block 4 memorizes the plural logic information data for defining each function of the logic cell block 1, the discrete block 2, and the plural wiring information data for defining function of the wiring cell block 3. Thereby, it is possible to easily connect the computer with plural peripheral devices having protocols different from each other in comparison with the conventional interface card.

Apart from the aforementioned explanation, wherein said one pair of the logic information data and the wiring information data are selected by designation of one address from the control block 5 to the ROM in the configuration block 4, an alternative construction may be such that a dipswitch is disposed in the control block 5, and the one pair of the logic information data and the wiring information data are selected by change of the dipswitch.

<<SECOND EMBODIMENT>>

Figure 2:
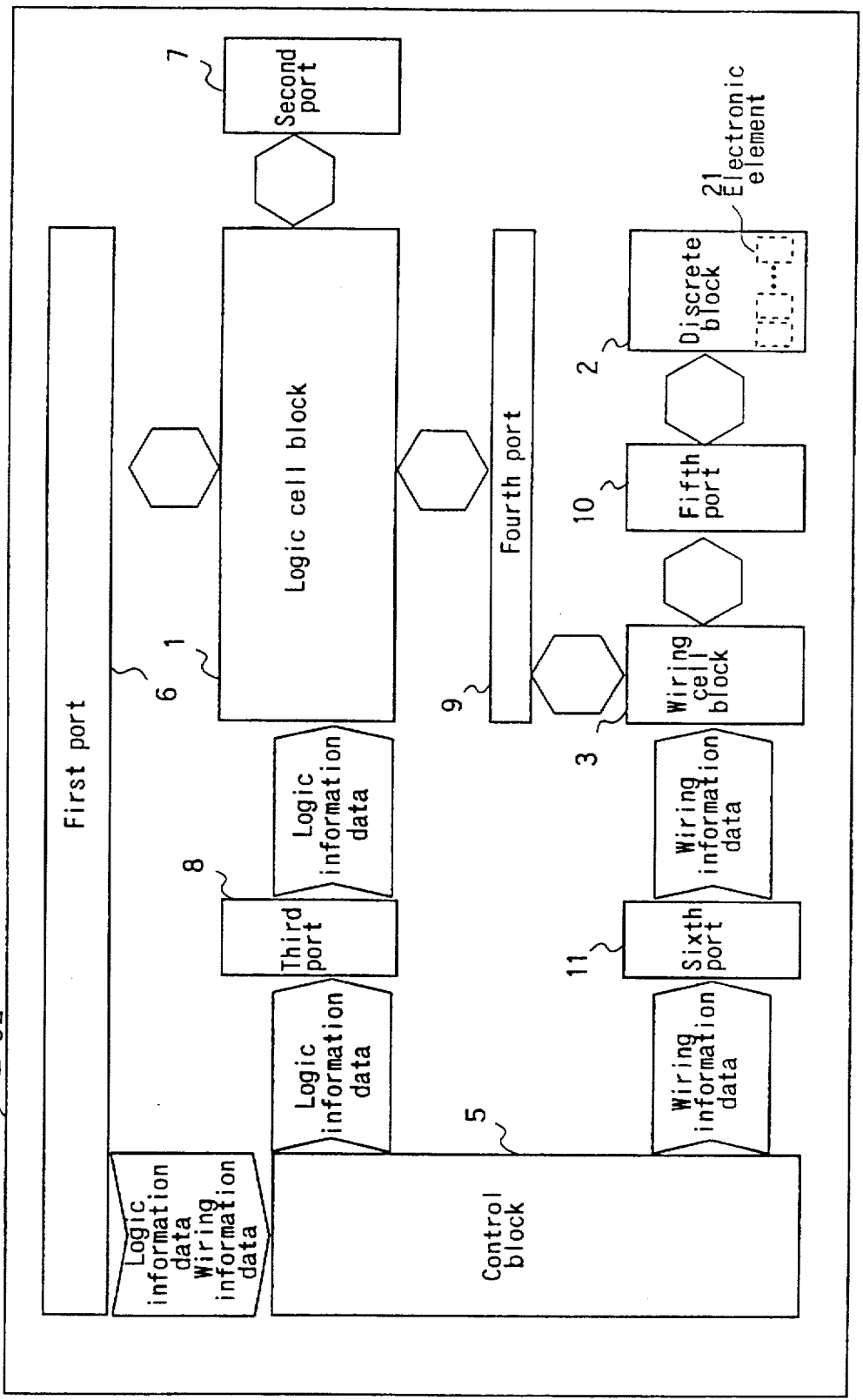
FIG. 2 is a block diagram showing an interface unit of a second embodiment of the present invention.

FIG. 2 is a block diagram showing an interface unit of a second embodiment of the present invention. In this second embodiment, an interface unit 52 is fundamentally the same as that of the first embodiment except for the control block 5 having function of interface with the first port 6. Therefore, corresponding parts and components to the first embodiment are shown by the same numerals and marks, and the description thereon made in the first embodiment similarly apply. In the following description, differences of this second embodiment from the first embodiment are mainly explained. There are such differences that the control block 5 is made logical connection with the first port 6, and that said one pair of the logic information data and the wiring information data are down-loaded to the logic cell block 1 and the wiring cell block 3, respectively.

As shown in FIG. 2, the control block 5 is connected with the first port 6, the third port 8, and the sixth port 11. When the user uses the interface unit 52, the user connects a memory device such as a hard-disk (not shown) disposed outside of the interface unit 52 with the first port 6. Successively, the one pair of the logic information data and the wiring information data are read from the memory device to the control block 5 through the first port 6 corresponding to the peripheral device to be connected with the computer.

Thereafter, as well as that of the first embodiment, the logic information data and the wiring information data are down-loaded from the control block 5 to the logic cell block 1 and the wiring cell block 3 through the third port 8 and the sixth port 11, respectively.

Thus, in the interface unit 52, the user can select said one pair of the plural logic information data and the plural wiring information data stored in the memory device in accordance with the peripheral device to be connected with the computer. Therefore, in comparison with that of the first embodiment, it is possible and easy to increase the number of the peripheral device to be interfaced with the computer. Furthermore, even if change of the logic information data and the wiring information data are required to change because of trouble such as generation of a bug, and/or their version-up, it is possible to change the logic information data and the wiring information data in the memory device without modification of the interface unit 52.

Apart from the aforementioned explanation, wherein the control block 5 is made in logical connection with the first part 6, an alternative construction may be such that the control block 5 is made in logical connection with the second port 7. Thereby, it is possible that the logic information data and the wiring information data are read from the memory device to the control block 5 through the second port 7.

<<THIRD EMBODIMENT>>

Figure 3:
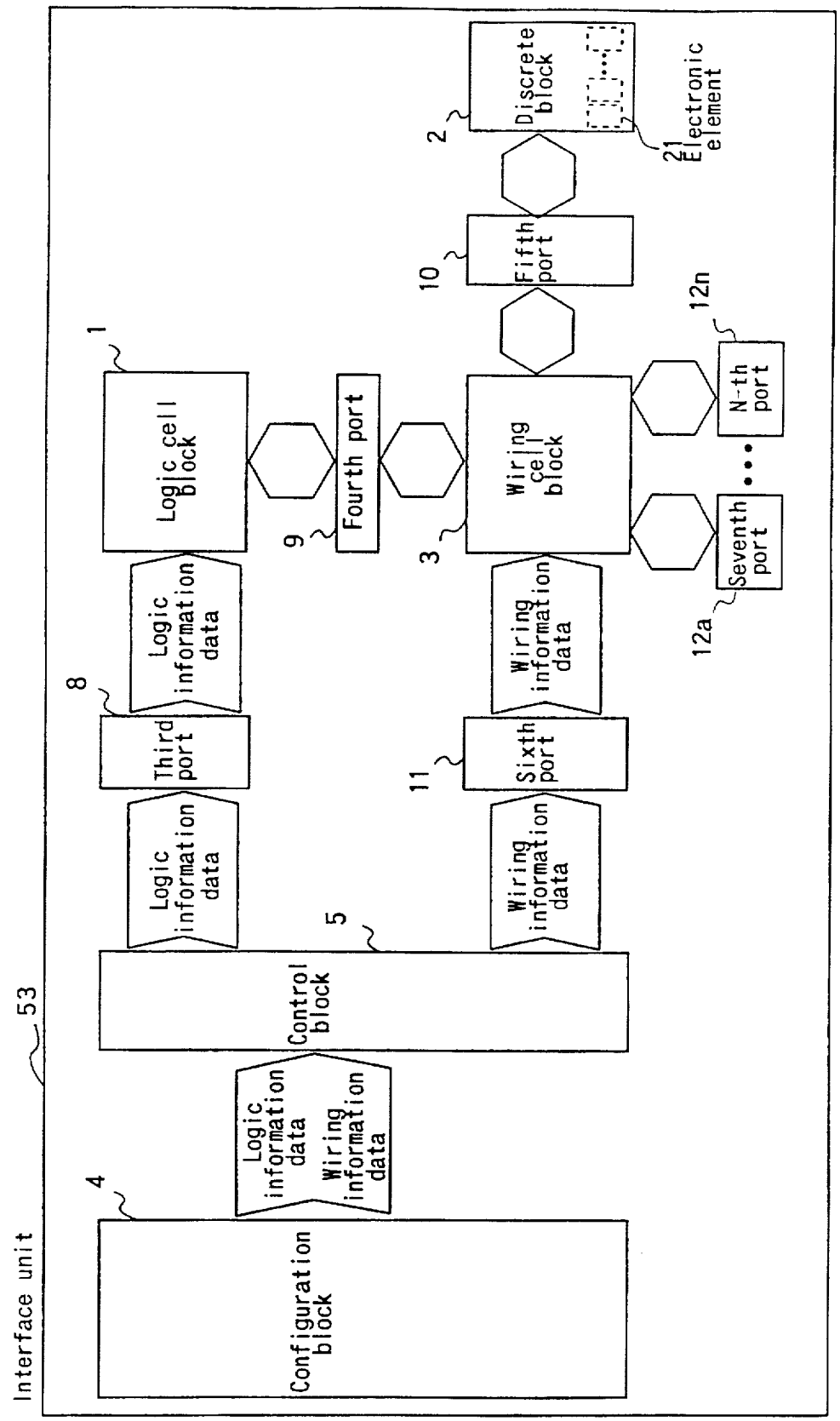
FIG. 3 is a block diagram showing an interface unit of a third embodiment of the present invention.

FIG. 3 is a block diagram showing an interface unit of a third embodiment of the present invention. In this third embodiment, an interface unit 53 is fundamentally the same as that of the first embodiment except for a wiring cell block 3' connected with a seventh port 12a through an N-th port 12n (N; integer≧8). Therefore, corresponding parts and components to the first embodiment are shown by the same numerals and marks, and the description thereon made in the first embodiment similarly apply. In the following description, differences of the third embodiment from the first embodiment are mainly explained. There are such differences that the wiring cell block 3' is connected with not only the fourth, the fifth, and the sixth ports 9, 10, and 11 but also with the seventh port 12a through the N-th port 12n which are to be connected with the computer and the peripheral device.

As shown in FIG. 3, the wiring cell block 3' is connected with the seventh port 12a through the N-th port 12n as well as the fourth port 9, the fifth port 10, and the sixth port 11. Each of the seventh port 12a through the N-th port 12n is connected with any one of the computer and the peripheral device. When the user uses the interface unit 53, the user selects said one pair of the plural logic information data and the plural wiring information data corresponding to the peripheral device to be connected with the computer. Thereby, the logic information data and the wiring information data are down-loaded to the logic cell block 1 and the wiring cell block 3', respectively. Successively, in the wiring cell block 3', the wiring relation with the fourth port 9, the fifth port 10, and the seventh port 12a through the N-th port 12n is made programmable. Simultaneously, in the logic cell block 1, the functional relation with the fourth port 9 is made programmable. As a result, the transfer mode is converted in the logic cell block 1 and the discrete block 2 as well as that of the first embodiment. Thereby, it is possible to make desired logical connection between the CPU of the computer and the peripheral device.

According to the interface unit 53, it is possible to improve independency of the logic cell block 1, and to use as a multi-platform easily. That is, in the computer and the peripheral device, their connectors for connecting with the interface unit are different about pin array owing to difference in specifications of the computer and the peripheral device. On the other hand, in the interface unit 53, the seventh port 12a through the Nth port 12n are connected with the wiring cell block 3'. Therefore, by using the seventh port 12a through the N-th port 12n respectively having pin arrays different from each other, it is possible to connect with the plural computers and the plural peripheral devices without modification of the logic cell block 1.

Furthermore, since electrical connections among the plural computers and the plural peripheral devices are executed in the wiring cell block 3', it is possible that the data are directly transferred among the plural computers and the plural peripheral devices.

<<FOURTH EMBODIMENT>>

Figure 4:
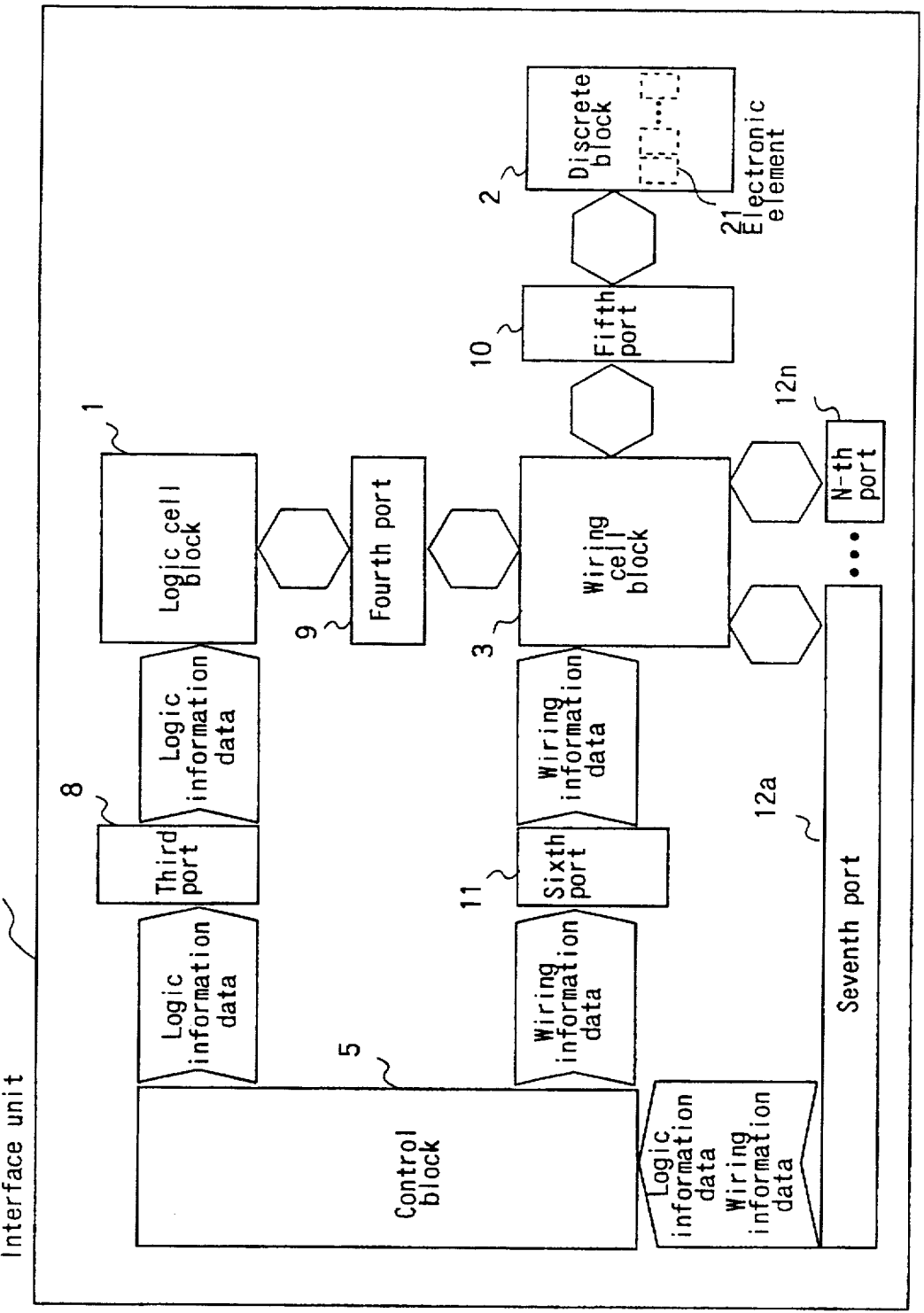
FIG. 4 is a block diagram showing an interface unit of a fourth embodiment of the present invention.

FIG. 4 is a block diagram showing an interface unit of a fourth embodiment of the present invention. In this fourth embodiment, an interface unit 54 is fundamentally the same as that of the third embodiment except for the control block 5 having function of interface with the seventh port 12a. Therefore, corresponding parts and components to the third embodiment are shown by the same numerals and marks, and the description thereon made in the third embodiment similarly apply. In the following description, differences of the fourth embodiment from the third embodiment are mainly explained. There are such differences that the one pair of the logic information data and the wiring information data are down-loaded from the memory device to the logic cell block 1 and the wiring cell block 3', respectively, through the seventh port 12a and the control block 5.

As shown in FIG. 4, the control block 5 is connected with the third port 8, the sixth port 11, and the seventh port 12a. When the user uses the interface unit 54, the user connects the memory device (not shown) disposed outside of the interface unit 54 with the seventh port 12a. Successively, the one pair of the logic information data and the wiring information data are read from the memory device to the control block 5 through the seventh port 12a corresponding to the peripheral device to be connected with the computer. Thereafter, similarly to that of the third embodiment, the logic information data and the wiring information data are down-loaded from the control block 5 to the logic cell block 1 and the wiring cell block 3' through the third port 8 and the sixth port 11, respectively.

Thus, in the interface unit 54, the user can select the one pair of the plural logic information data and the plural wiring information data stored in the memory device in accordance with the peripheral device to be connected with the computer. Therefore, it is possible to increase the number of the peripheral device to be interfaced with the computer in comparison with that of the third embodiment easily. Furthermore, even if the logic information data and the wiring information data are required to change because of trouble such as generation of the bug, and/or their version-up, it is possible to change the logic information data and the wiring information data in the memory device without modification of the interface unit 54.

<<FIFTH EMBODIMENT>>

Figure 5:
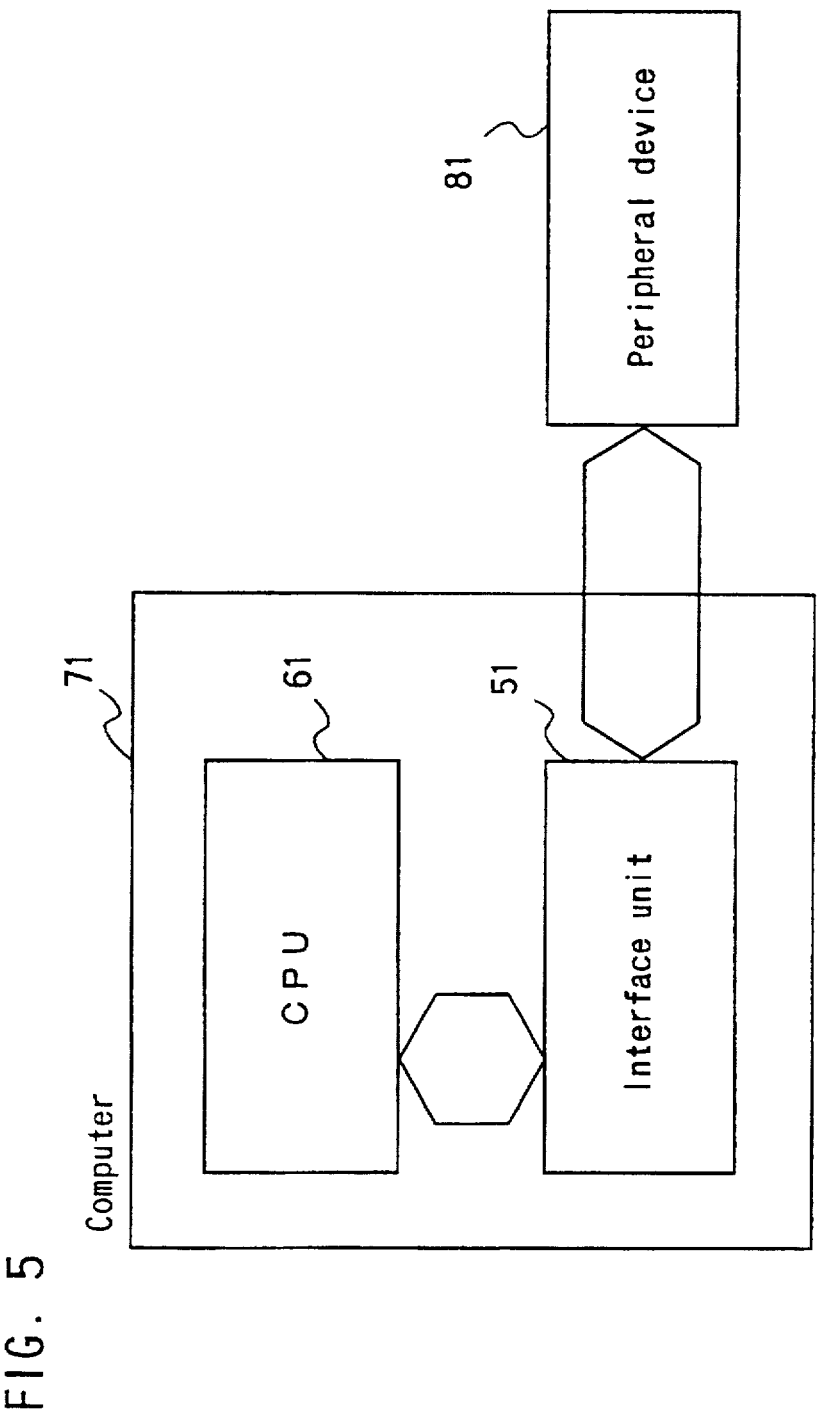
FIG. 5 is a block diagram showing a computer of a fifth embodiment of the present invention.

FIG. 5 is a block diagram showing a computer of a fifth embodiment of the present invention.

As shown in FIG. 5, a computer 71 includes a CPU 61 and at least one interface unit 51 of the first embodiment, and has a connector (not shown) for connecting with a peripheral device 81. The CPU 61 is connected with one of the first port 6 (FIG. 1) and the second port 7 (FIG. 1). The above-mentioned connector is connected with the other of the first port 6 and the second port 7.

The user controls the control block 5 (FIG. 1) by the CPU 61, so that the one pair of the plural logic information data and the plural wiring information data are read from the configuration block 4 (FIG. 1) in accordance with the peripheral device 81 to be connected with the CPU 61. Thereby, the plural logic information data and the plural wiring information data are down-loaded to the logic cell block 1 (FIG. 1) and the wiring cell block 3 (FIG. 1), respectively. Successively, the transfer mode is converted in the logic cell block 1 and the discrete block 2 (FIG. 1), so that the CPU 61 is made logical connection with the peripheral device 81. The peripheral device 81 is a modem, a LAN, or a printer etc., and configuration of its' connector is different owing to difference of specifications of the peripheral device 81. Therefore, an adapter is used for connecting the connector of the computer 71 with the connector of the peripheral device 81 having a configuration different from the connector of the computer 71.

Thus, in the interface unit 51 embedded in the computer 71, a hardware for converting the transfer mode is constituted with the logic cell block 1, the discrete block 2 and the wiring cell block 3. Furthermore, the configuration block 4 memorizes the plural logic information data for defining each function of the logic cell block 1 and the discrete block 2, and the plural wiring information data for defining function of the wiring cell block 3. Thereby, it is possible to easily connect the computer 71 with the plural peripheral devices 81 having protocols different from each other in comparison with the conventional interface card.

Furthermore, since the peripheral device 81 is connected with the interface unit 51 by using the connector, it is possible that the interface unit 51 is built or installed in the computer 71 without bulking the size of the computer 71.

<<SIXTH EMBODIMENT>>

Figure 6:
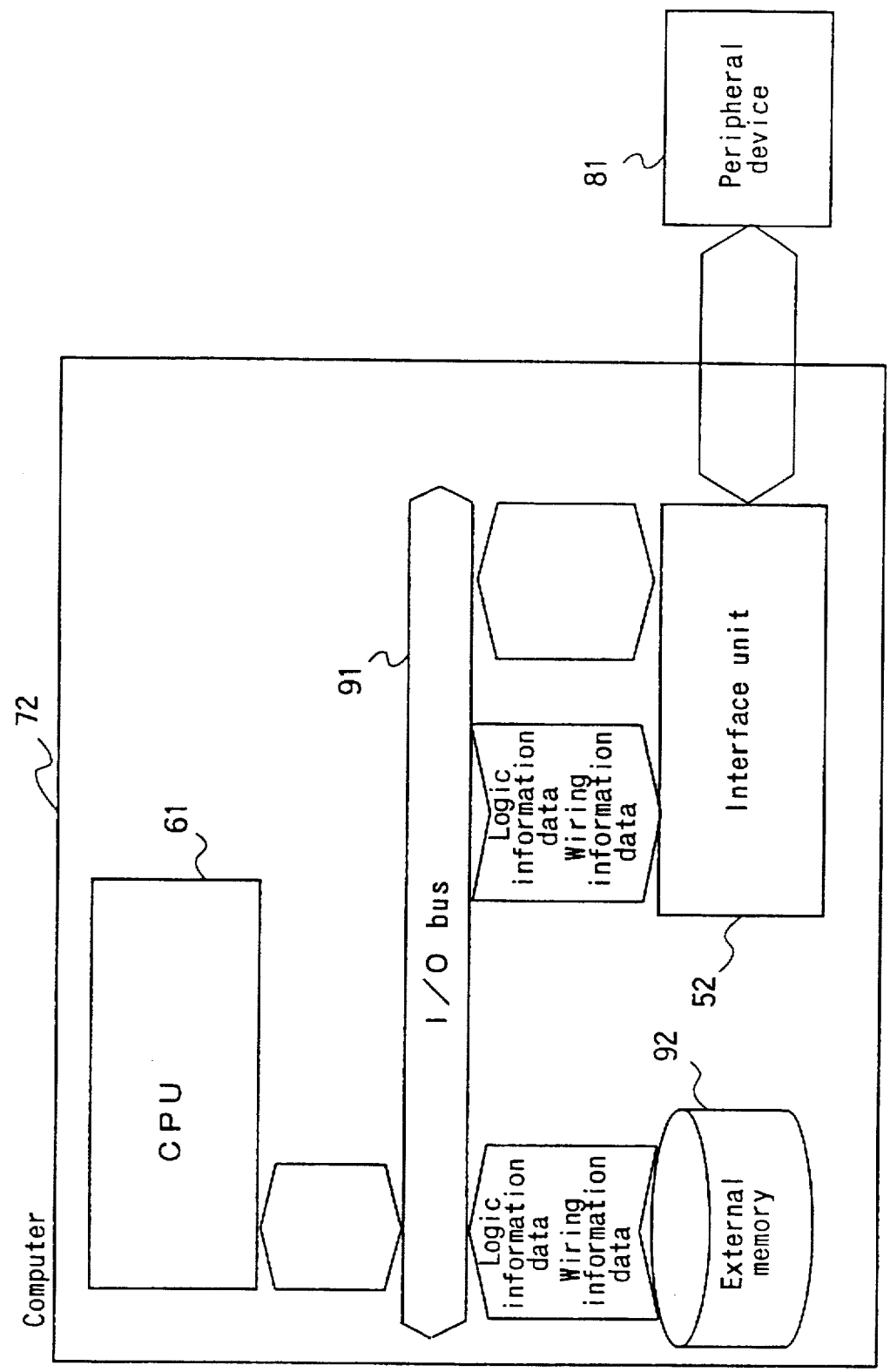
FIG. 6 is a block diagram showing a computer of a sixth embodiment of the present invention.

FIG. 6 is a block diagram showing a computer of a sixth embodiment of the present invention. In this sixth embodiment, a computer 72 is fundamentally the same as that of the fifth embodiment except for including an I/O bus 91, an external memory 90, and the interface unit 52 of the second embodiment. Therefore, corresponding parts and components to the fifth embodiment are shown by the same numerals and marks, and the description thereon made in the fifth embodiment similarly apply. In the following description, differences of this sixth embodiment from the fifth embodiment are mainly explained. The main difference is that the CPU 61 is connected with the interface unit 52 and the external memory 92 by the I/O bus 91, and the logic information data and the wiring information data stored in the external memory 92 are read to the first port 6 (FIG. 2) by the CPU 61.

As shown in FIG. 6, the CPU 61 is connected with the interface unit 52 and the external memory 92 in the computer 72. The external memory 92 memorizes the plural logic information data and the plural wiring information data.

When the user connects the CPU 61 with the peripheral device 81, the one pair of the logic information data and the wiring information data are read from the external memory 92 to the control block 5 (FIG. 2) through the I/O bus 91 and the first port 6 (FIG. 2) corresponding to the peripheral device 81. Thereafter, the logic information data and the wiring information data are down-loaded from the control block 5 to the logic cell block 1 and the wiring cell block 3 through the third port 8 and the sixth port 11, respectively.

Thus, in the computer 72, the external memory 92 memorizes the plural logic information data and the plural wiring information data. Therefore, it is possible to increase the number of the peripheral device 81 to be interfaced with the CPU 61 in comparison with that of the fifth embodiment easily. Furthermore, even if the logic information data and the wiring information data are required to change because of trouble such as generation of the bug, and/or their version-up, it is possible to change the logic information data and the wiring information data in the external memory 92 without modification of the interface unit 52.

<<SEVENTH EMBODIMENT>>

Figure 7:
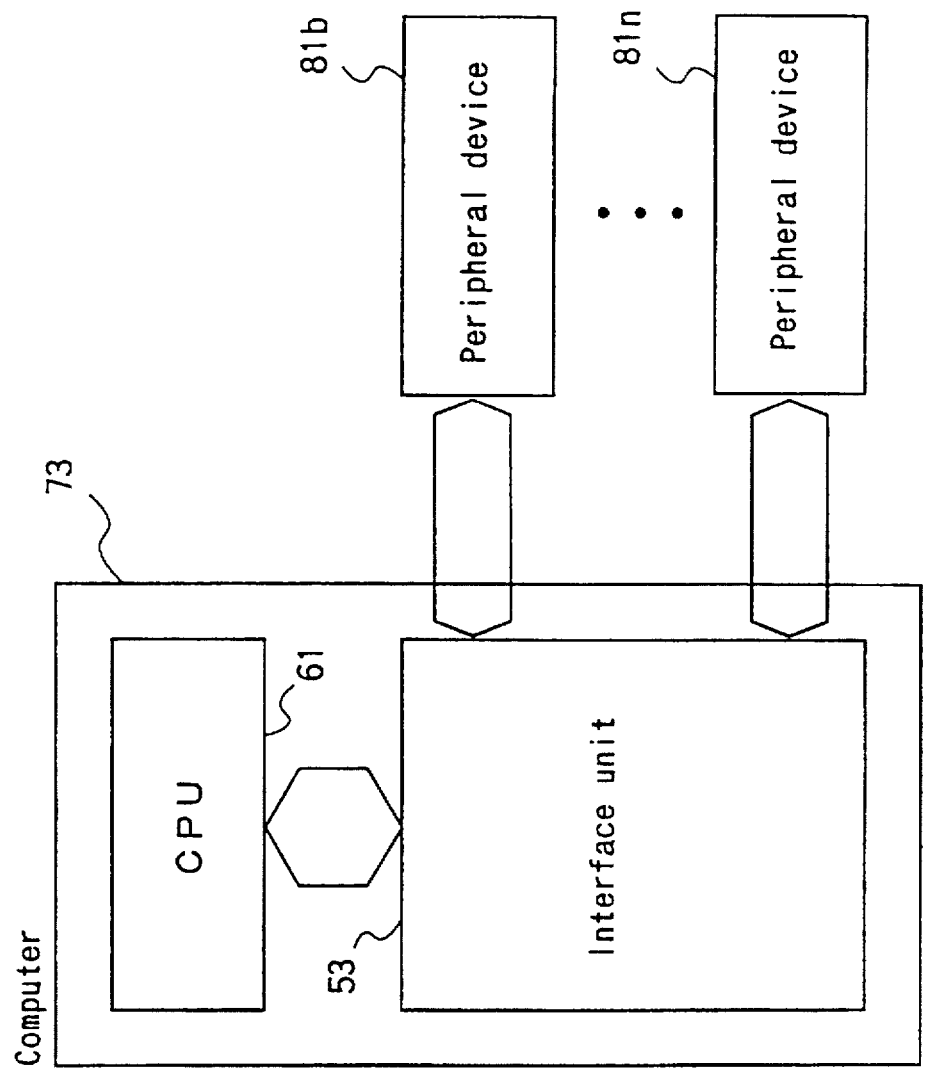
FIG. 7 is a block diagram showing a computer of a seventh embodiment of the present invention.

FIG. 7 is a block diagram showing a computer of a seventh embodiment of the present invention. In this seventh embodiment, a computer 73 is fundamentally the same as that of the fifth embodiment except for including the interface unit 53 of the third embodiment. Therefore, corresponding parts and components to the fifth embodiment are shown by the same numerals and marks, and the description thereon made in the fifth embodiment similarly apply. In the following description, differences of this seventh embodiment from the fifth embodiment are mainly explained. The main difference is that the interface unit 53 is connected with the CPU 61 and the plural peripheral devices 81b–81n.

As shown in FIG. 7, the computer 73 includes the CPU 61 and the interface unit 53 connected with the CPU 61. The CPU 61 is connected with the wiring cell block 3' (FIG. 3) through one of the seventh port 12a (FIG. 3) through the N-th port 12n (FIG. 3). Each of the plural peripheral devices 81b–81n is connected with one of the seventh port 12a through the N-th port 12n by a connector (not shown).

According to such configuration of the computer 73, it is possible to connect the plural peripheral devices 81b–81n with the CPU 61. Furthermore, since electrical connections among the CPU 61 and the plural peripheral devices 81b–81n are executed in the wiring cell block 3', it is possible to realize direct data transfer among the CPU 61 and the plural peripheral devices 81b–81n.

<<EIGHTH EMBODIMENT>>

Figure 8:
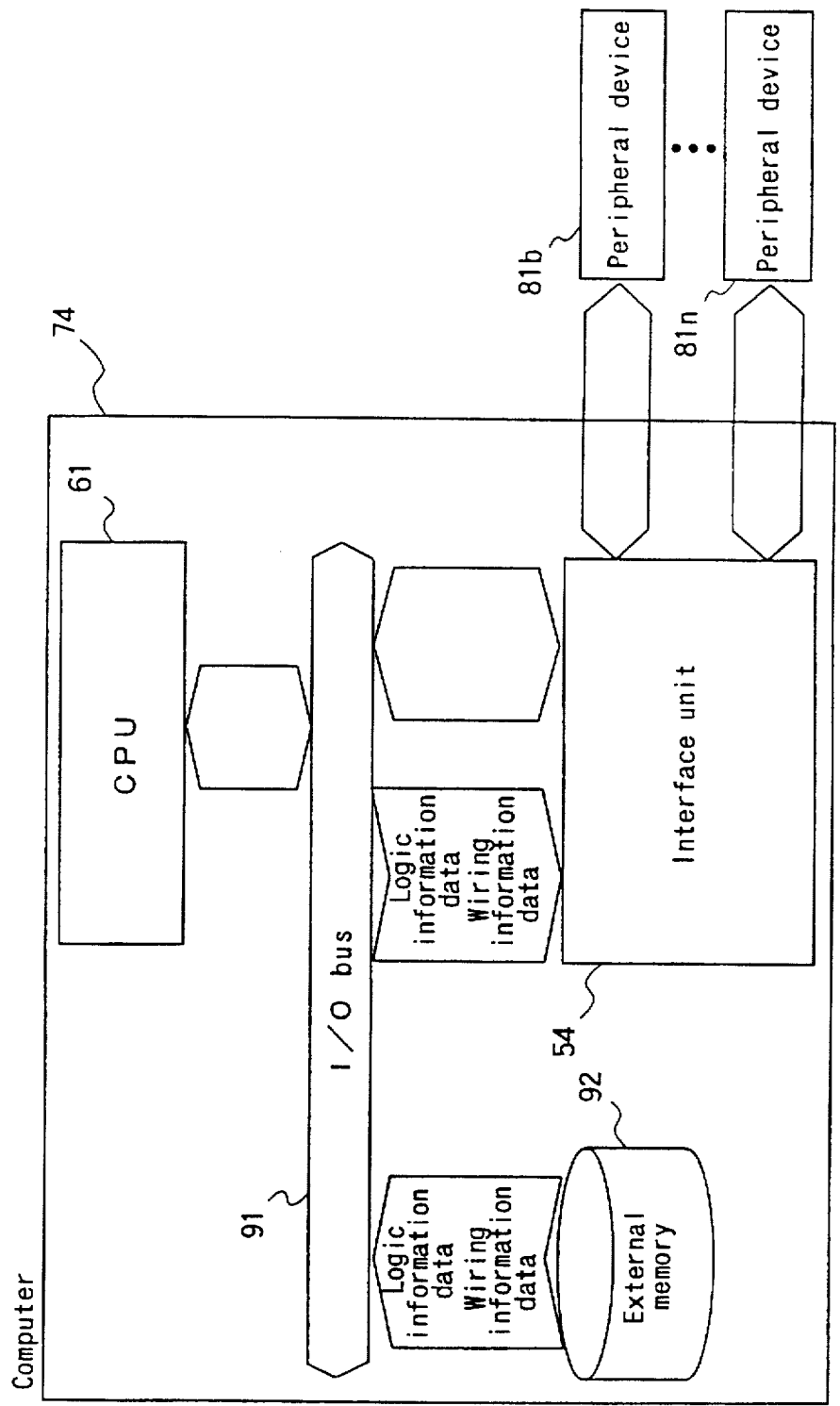
FIG. 8 is a block diagram showing a computer of an eighth embodiment of the present invention.

FIG. 8 is a block diagram showing a computer of an eighth embodiment of the present invention. In this eighth embodiment, a computer 74 is fundamentally the same as that of the seventh embodiment except for including the I/O bus 91, the external memory 92, and the interface unit 54 of the fourth embodiment. Therefore, corresponding parts and components to the seventh embodiment are shown by the same numerals and marks, and the description thereon made in the seventh embodiment similarly apply. In the following description, differences of this eighth embodiment from the seventh embodiment are mainly explained. The main difference is that the CPU 61 is connected with the interface unit 54 and the external memory 92 by the I/O bus 91, and the logic information data and the wiring information data stored in the external memory 92 are read to the seventh port 12a (FIG. 4) by the CPU 61.

As shown in FIG. 8, the CPU 61 is connected with the interface unit 54 and the external memory 92 in the computer 74. The external memory 92 memorizes the plural logic information data and the plural wiring information data.

Thus, in the computer 74, the external memory 92 memorizes the plural logic information data and the plural wiring information data. Therefore, it is possible to increase the number of the plural peripheral devices 81b–81n to be interfaced with the CPU 61 in comparison with that of the seventh embodiment easily. Furthermore, in the case of changing the logic information data and the wiring information data, for instance in the case of trouble such as generation of the bug, and/or their version-up, it is possible to change the logic information data and the wiring information data in the external memory 92 without modification of the interface unit 54.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An interface unit comprising:

a configuration block for memorizing plural logic information data and plural wiring information data, a logic cell block connected with a first port, a second port, a third port, and a fourth port, said logic cell block being programmable for a functional relation with said first port, said second port, and said fourth port in accordance with one of said plural logic information data issued from said third port, a discrete block consisting of plural electronic elements connected with a fifth port, for supplementing function of said logic cell block, a wiring cell block connected with said fourth port, said fifth port, and a sixth port, said wiring cell block being programmable for a relation with said fourth port and said fifth port in accordance with one of said plural wiring information data issued from said sixth port, and a control block for transferring said one of said plural logic information data and said one of said plural wiring information data to said logic cell block and said wiring cell block through said third port and said sixth port, respectively, said first port and said second port being interfaced with each other.

2. An interface unit comprising:

a logic cell block connected with a first port, a second port, a third port, and a fourth port, said logic cell block being programmable for a functional relation with said first port, said second port, and said fourth port in accordance with a logic information data issued from said third port, a discrete block consisting of plural electronic elements connected with a fifth port, for supplementing function of said logic cell block, a wiring cell block connected with said fourth port, said fifth port, and a sixth port, said wiring cell block being programmable for a relation with said fourth port and said fifth port in accordance with a wiring information data issued from said sixth port, and a control block connected with one of said first port and said second port, for transferring said logic information data and said wiring information data to said logic cell block and said wiring cell block through said third port and said sixth port, respectively, said first port and said second port being interfaced with each other.

3. An interface unit comprising:

a configuration block for memorizing plural logic information data and plural wiring information data, a logic cell block connected with a third port and a fourth port, said logic cell block being programmable for a functional relation with said fourth port in accordance with one of said plural logic information data issued from said third port, a discrete block consisting of plural electronic elements connected with a fifth port, for supplementing function of said logic cell block, a wiring cell block connected with said fourth port, said fifth port, a sixth port, and a seventh port through an N-th port (N; integer≧8), said wiring cell block being programmable for a relation with said fourth port, said fifth port, and said seventh port through said N-th port in accordance with one of said plural wiring information data issued from said sixth port, and a control block for transferring said one of said plural logic information data and said one of said plural wiring information data to said logic cell block and said wiring cell block through said third port and said sixth port, respectively, said seventh port through said N-th port being interfaced with each other.

4. An interface unit comprising:

a logic cell block connected with a third port and a fourth port, said logic cell block being programmable for a functional relation with said fourth port in accordance with a logic information data issued from said third port, a discrete block consisting of plural electronic elements connected with a fifth port, for supplementing function of said logic cell block, a wiring cell block connected with said fourth port, said fifth port, a sixth port, and a seventh port through an N-th port (N; integer≧8), said wiring cell block being programmable for a relation with said fourth port, said fifth port, and said seventh port through said N-th port in accordance with a wiring information data issued from said sixth port, and a control block connected with one of said seventh port through said N-th port, for transferring said logic information data and said wiring information data to said logic cell block and said wiring cell block through said third port and said sixth port, respectively, said seventh port through said N-th port being interfaced with each other.

5. A computer comprising:

a configuration block for memorizing plural logic information data and plural wiring information data, a logic cell block connected with a first port, a second port, a third port, and a fourth port, said logic cell block being programmable for a functional relation with said first port, said second port, and said fourth port in accordance with one of said plural logic information data issued from said third port, a discrete block consisting of plural electronic elements connected with a fifth port, for supplementing function of said logic cell block, a wiring cell block connected with said fourth port, said fifth port, and a sixth port, said wiring cell block being programmable for a relation with said fourth port and said fifth port in accordance with one of said plural wiring information data issued from said sixth port, a control block for transferring said one of said plural logic information data and said one of said plural wiring information data to said logic cell block and said wiring cell block through said third port and said sixth port, respectively, and a CPU connected with one of said first port and said second port, said CPU for controlling said control block.

said first port and said second port being interfaced with each other.

6. A computer comprising:

a logic cell block connected with a first port, a second port, a third port, and a fourth port, said logic cell block being programmable for a functional relation with said first port, said second port, and said fourth port in accordance with a logic information data issued from said third port, a discrete block consisting of plural electronic elements connected with a fifth port, for supplementing function of said logic cell block, a wiring cell block connected with said fourth port, said fifth port, and a sixth port, said wiring cell block being programmable for a relation with said fourth port and said fifth port in accordance with a wiring information data issued from said sixth port, and a control block connected with one of said first port and said second port, for transferring said logic information data and said wiring information data to said logic cell block and said wiring cell block through said third port and said sixth port, respectively, a CPU connected with one of said first port and said second port, said CPU for controlling said control block, and an external memory connected with said one of said first port and said second port, said external memory for memorizing a plurality of said logic information data and plurality of said wiring information data, said first port and said second port being interfaced with each other.

7. A computer comprising:

a configuration block for memorizing plural logic information data and plural wiring information data, a logic cell block connected with a third port and a fourth port, said logic cell block being programmable for a functional relation with said fourth port in accordance with one of said plural logic information data issued from said third port, a discrete block consisting of plural electronic elements connected with a fifth port, for supplementing function of said logic cell block, a wiring cell block connected with said fourth port, said fifth port, a sixth port, and a seventh port through an N-th port (N; integer≧8), said wiring cell block being programmable for a relation with said fourth port, said fifth port, and said seventh port through said N-th port in accordance with one of said plural wiring information data issued from said sixth port, a control block for transferring said one of said plural logic information data and said one of said plural wiring information data to said logic cell block and said wiring cell block through said third port and said sixth port, respectively, and a CPU connected with one of said seventh port through said N-th port, said CPU for controlling said control block, said seventh port through said N-th port being interfaced with each other.

8. A computer comprising:

a logic cell block connected with a third port and a fourth port, said logic cell block being programmable for a functional relation with said fourth port in accordance with a logic information data issued from said third port, a discrete block consisting of plural electronic elements connected with a fifth port, for supplementing function of said logic cell block, a wiring cell block connected with said fourth port, said fifth port, a sixth port, and a seventh port through an N-th port (N; integer≧8), said wiring cell block being programmable for a relation with said fourth port, said fifth port, and said seventh port through said N-th port in accordance with a wiring information data issued from said sixth port, a control block connected with one of said seventh port through said N-th port, for transferring said logic information data and said wiring information data to said logic cell block and said wiring cell block through said third port and said sixth port, respectively, a CPU connected with one of said seventh port through said N-th port, said CPU for controlling said control block, and an external memory connected with said one of said seventh port through said N-th port, said external memory for memorizing a plurality of said logic information data and plurality of said wiring information data, said seventh port through said N-th port being interfaced with each other.

* * * * *